United States Patent
Vo et al.

(10) Patent No.: US 6,540,534 B2
(45) Date of Patent: Apr. 1, 2003

(54) TELEPHONE WIRING INTERCONNECT APPARATUS AND METHOD

(75) Inventors: Chanh C. Vo, Arlington, TX (US); Boyd G. Brower, Keller, TX (US); John J. Napiorkowski, Irving, TX (US); Kristen C. Stohr, Ft. Worth, TX (US); Brad N. Grunwald, Euless, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/776,389

(22) Filed: Feb. 2, 2001

(65) Prior Publication Data

US 2002/0106922 A1 Aug. 8, 2002

(51) Int. Cl.[7] .............................................. H01R 29/00
(52) U.S. Cl. ...................................................... 439/188
(58) Field of Search ................................ 439/188, 101, 439/412

(56) References Cited

U.S. PATENT DOCUMENTS

| | | | |
|---|---|---|---|
| 4,118,091 A | * 10/1978 | Frisby | 439/101 |
| 5,153,910 A | 10/1992 | Michelson et al. | 379/399 |
| 5,291,553 A | * 3/1994 | Smith | 379/399 |
| 5,359,654 A | 10/1994 | Jensen et al. | 379/397 |
| 5,414,765 A | 5/1995 | Lanquist et al. | 379/399 |
| 5,704,797 A | 1/1998 | Meyerhoefer et al. | 439/188 |
| 5,846,099 A | * 12/1998 | Hiruma et al. | 439/620 |
| 5,867,576 A | * 2/1999 | Norden | 439/188 |
| 5,993,265 A | * 11/1999 | Daoud | 439/676 |
| 6,099,343 A | * 8/2000 | Bonvallat et al. | 439/412 |
| 6,231,362 B1 | * 5/2001 | Wu | 439/188 |
| 6,238,250 B1 | * 5/2001 | Stohr et al. | 439/676 |

* cited by examiner

Primary Examiner—Lynn Field
Assistant Examiner—Brian S. Webb
(74) Attorney, Agent, or Firm—Christopher C. Dremann (57) ABSTRACT

An interconnect apparatus for electrically connecting Telco wires to subscriber wires is arranged and configured to withstand overcurrent and overvoltage conditions. The interconnect apparatus includes a jack, a first set of contacts, and a first set of by-pass conductors. The first set of by-pass conductors is electrically connected to the first set of contacts and has a greater current carrying capacity than the first set of contacts. The interconnect apparatus further includes a second set of by-pass conductors and a plug. The second set of by-pass conductors is electrically connected to the first set of by-pass conductors when the plug and jack are engaged. The second set of by-pass conductors may also have a greater current carrying capacity than the first set of contacts. Preferably, the first set of by-pass conductors is spaced sufficiently apart and the second set of by-pass conductors is spaced sufficiently apart to substantially eliminate arcing.

20 Claims, 12 Drawing Sheets

TELEPHONE WIRING INTERCONNECT APPARATUS AND METHOD

BACKGROUND OF THE INVENTION

1. Field of the Invention

The present invention relates to telephone wiring interconnect apparatus and method, and more particularly, to an interconnect apparatus of the type commonly used in a network interface device (NID), such as a protected terminal device (PID) or line module. The apparatus is used to interconnect wiring from a telephone service provider with subscriber wiring. Specifically, the present invention relates to an improved telephone interconnect apparatus that can withstand overcurrent and overvoltage conditions.

2. Description of the Related Art

Figure 1:
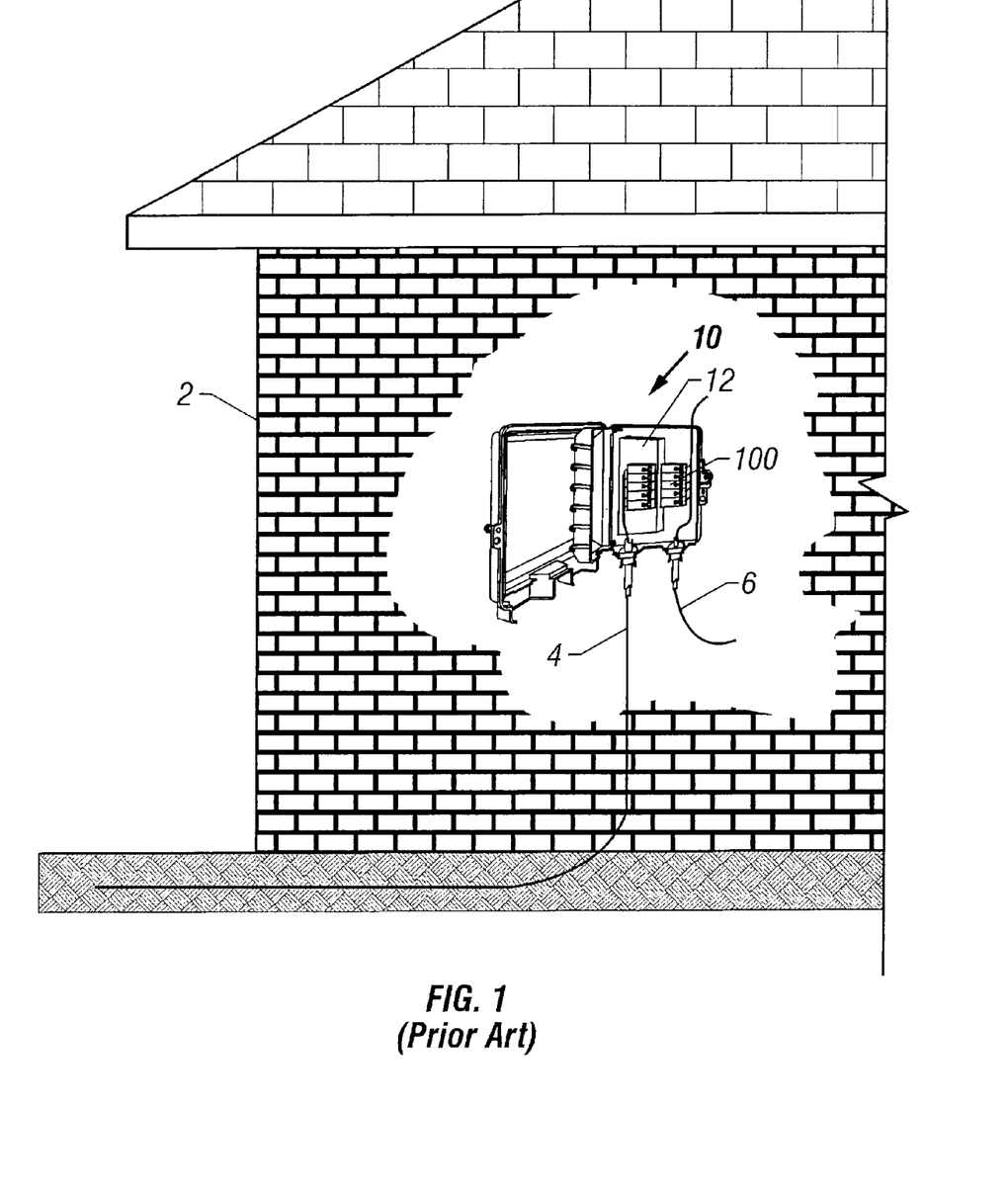
FIG. 1 is a perspective view of a prior art network interface device (NID) mounted to the exterior wall of a house or commercial building.

Telephone service is provided by a telephone company ("Telco") to a number of different subscribers. Each subscriber may purchase as many separate telephone lines as desired and equip his or her home or business with various telephone equipment. Subscribers are responsible for proper operation of the telephone equipment and the Telco is responsible for proper operation of the telephone network up to the interface between the Telco wiring and the subscriber wiring. Therefore, it is desirable to provide a telephone network interface device (NID) to serve as demarcation point between the Telco wiring and the subscriber wiring. FIG. 1 illustrates a typical prior art NID 10. The NID 10 may be mounted to an exterior wall of a house or commercial building 2. The Telco wiring 4 enters the NID and terminates in a locked inner enclosure 12, which is shown in the open position for purposes of clarity. The Telco wiring 4 may come in bundle, of, for example, twisted pair wires. The bundle of twisted pair wires can-be split and each pair terminated into a connector block within the inner enclosure 12.

The inner enclosure 12 is preferably locked to prevent unauthorized access by the subscriber or vandals. Typically, each subscriber telephone line is serviced by one set of twisted pair wires, commonly referred to as the "tip" and "ring" wires. Each of the twisted pair wires is electrically connected to an interconnect apparatus, such as a protected terminal device (PTD) or line module 100, located adjacent the inner enclosure 12. In other words, the tip and ring wires from one twisted pair are inserted into one end of the interconnect apparatus 100 and electrically coupled to a pair of conductors within the apparatus. The interconnect apparatus 100 is typically a modular device that can be mounted in the NID and easily replaced if rendered inoperable.

Figure 2A:
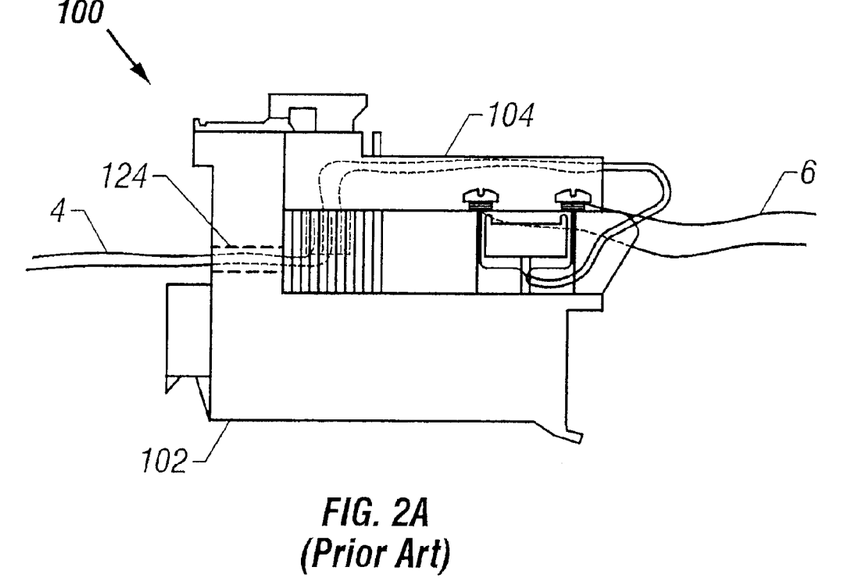
FIGS. 2A to 2D are side elevation views and FIG. 2E is a top plan view of a prior art interconnect apparatus, namely a line module, having a removable bridge.
Figure 2B:
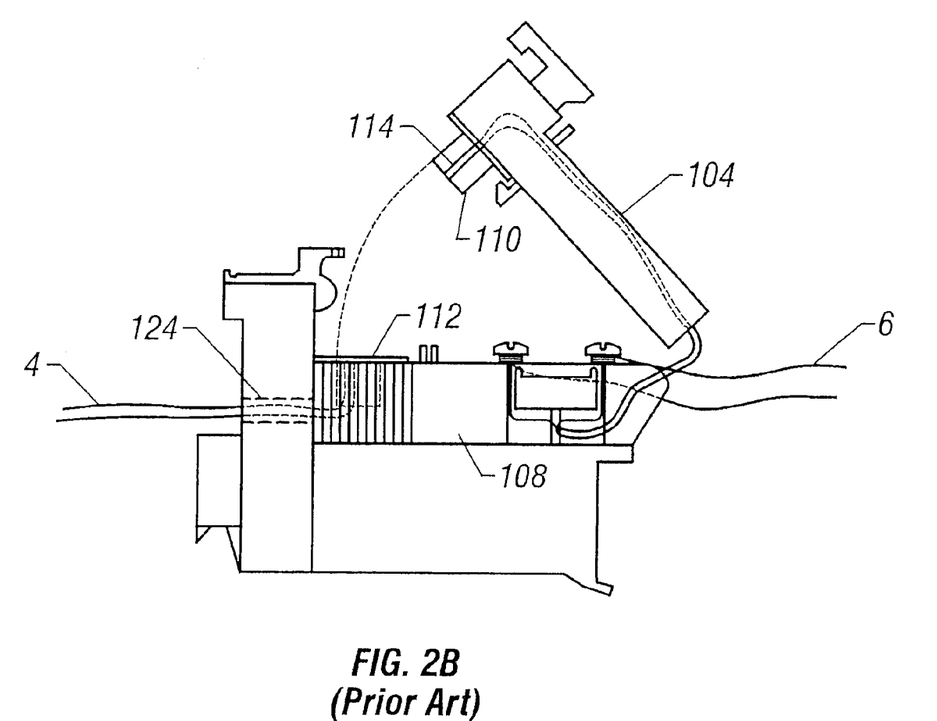
Figure 2C:
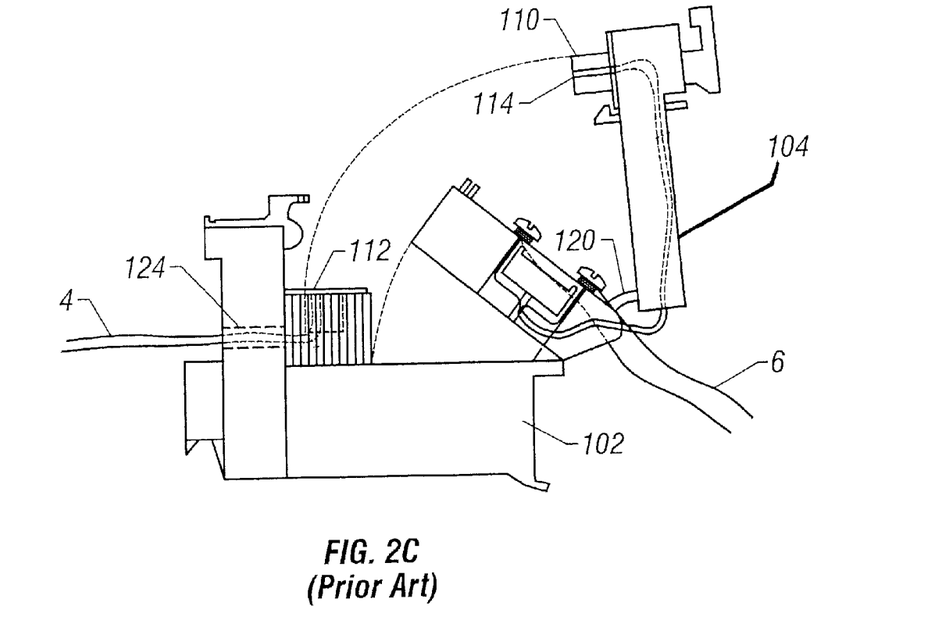
Figure 2D:
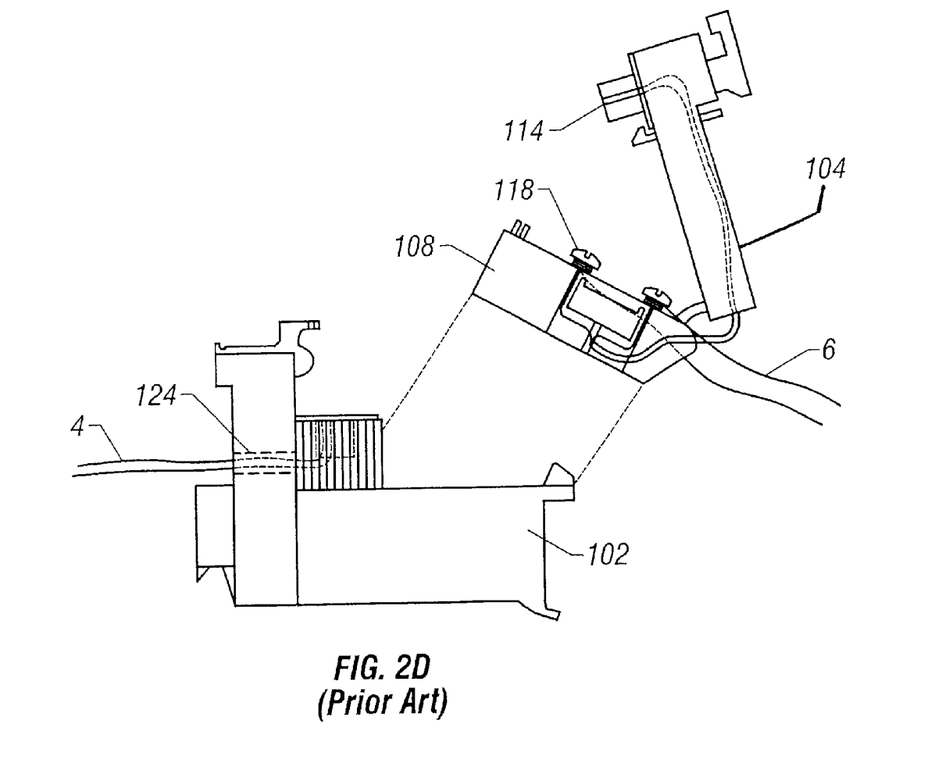
Figure 2E:
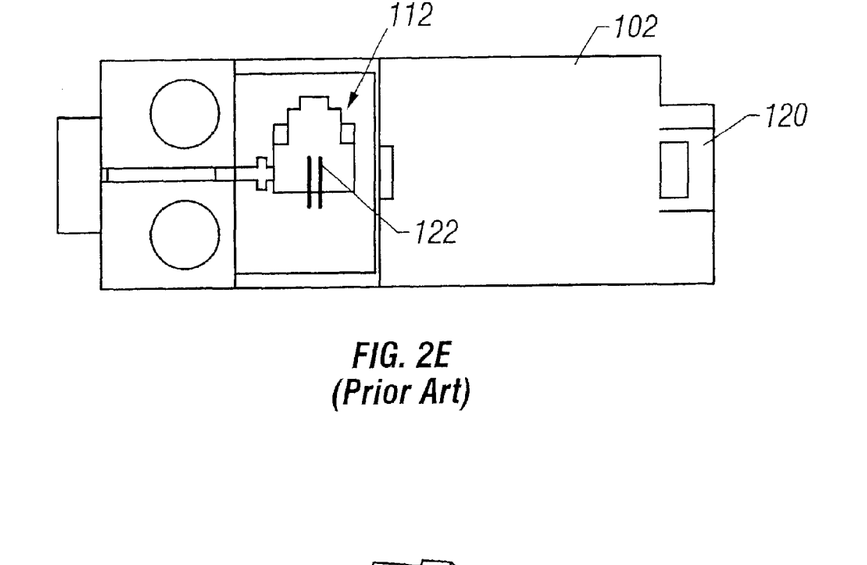

Referring to FIGS. 2A to 2E, a prior art line module 100 is shown in greater detail. The line module 100 has a housing 102 and a cover 104 that can pivot between a closed position, as shown in FIG. 2A, and an open position, as shown in FIG. 2B. The housing 102 of the line module 100 has a pair of insertion channels 124 that allow that Telco wires 4 to be electrically coupled with a pair of contacts 122 (FIG. 2E) located in an integrated jack 112. As shown, the jack 122 is a conventional RJ-11 jack. The cover 104 may be connected to the line module 100 by a hinge 120 (FIG. 2C) so that the cover 104 can be rotated away from the housing 102 of the line module 100 to permit access to the jack 112. As mentioned, the jack 112 has a pair of contacts 122 that are electrically coupled to the tip and ring wires. Likewise, plug 110 attached to the cover 104 has a complementary pair of conductors 114 that make contact with the jack contacts 122 when the plug 110 is engaged in the jack 112. The subscriber wires 6 are connected to a pair of terminals 118 provided on a portion of the line module 100 known as the bridge 108. The plug conductors 114 are also electrically coupled to the terminals 118. Thus, when the cover 104 is closed, an electrical circuit is completed between the Telco wires 4 and the subscriber wires 6. When the cover 104 is opened, the subscriber wires 6 are disconnected from the Telco wires 4. However, a test plug (not shown) can be plugged into the jack 112 to determine if the Telco wires 4 up to the line module 100 are conducting properly. As shown in FIGS. 2C and 2D, the bridge 108 is removable, and thus, replaceable if rendered inoperable. However, line module 100 may also be provided with a non-removable bridge.

The spacing and size of the plug conductors 114 and the jack conductors 122 are sources of failure when the line module 100 is subjected to overvoltage and overcurrent conditions. For example, a lightning strike on a telephone line may cause a voltage spike that will result in an electric arc between the tip and ring contacts of either the jack or the plug. In other words, the tip and ring wires are at different voltages. An overvoltage event magnifies the difference and may cause an electrical arc to jump between the closely spaced contacts. The contacts in RJ-11 plugs and sockets are relatively small gauge, typically 24 AWG or 25 AWG. An overcurrent event may result in the plug and jack conductors in contact with each other welding together. In either event, the line module 100 is rendered inoperable.

U.S. Pat. No. 5,153,910 discloses an example of a protected terminal device (PTD) for a NID used to connect Telco wiring with subscriber wiring. When the cover of the PTD is closed, an actuator presses a set of conductors into contact with a complementary set of thin lead contacts. The lead contacts in turn are connected to the Telco wiring. The subscriber wiring is connected through two terminal screws to the set of conductors. Thus, an electrical signal path is created from the subscriber wiring, through the terminal screws and conductors, and into lead contacts. While this simple design allows for easy connection of the subscriber and Telco wiring, it does not address the causes of the arcing or welding failure modes. Specifically, arcing may occur between the lead contacts because they are closely spaced. Furthermore, the small gauge lead contacts may become welded to the conductors.

It is thus apparent a particular need exists for an improved interconnect apparatus that can withstand overcurrent conditions and overvoltage conditions.

It is further apparent that a particular need exists for an improved interconnect apparatus including a test plug that remains functional when a cover is removed from the bridge and the electrical circuit between the Telco wires and the subscriber wires is broken.

It is further apparent that a particular need exists for an improved interconnect apparatus that can withstand overvoltage and overcurrent conditions regardless of whether the bridge is fixed or removable.

BRIEF SUMMARY OF THE INVENTION

The present invention relates to an improved interconnect apparatus, such as a protected terminal device (PTD) or line module, that can withstand overcurrent and overvoltage event, such as a lightening strike. The interconnect apparatus may, for example, be mounted within a conventional network interface device (NID). The interconnect apparatus uses large gauge by-pass conductors for signal transmission from the Telco to the subscriber rather than small gauge contacts. However, the jack located in the housing of the interconnect apparatus retains standard sized contacts that will interface with conventional test plugs.

In one embodiment, the improved interconnect apparatus includes a housing having a removable bridge and cover assembly. The bridge includes terminals for connection to the subscriber wires. The housing includes a jack having a first set of by-pass conductors and a first set of contacts. The first set of by-pass conductors include one conductor for the tip wire and one conductor for the ring wire. The first set of by-pass conductors oppose a second set of by-pass conductors located on a plug. The plug can be attached to the cover. When the plug is engaged with the jack, the first set of by-pass conductors electrically couple with the second set of by-pass conductors to complete an electrical circuit between the Telco wires and the subscriber wires. The plug, however, does not require a second set of contacts to complete an electrical circuit with the first set of contacts. When the cover is opened, the first and second set of by-pass conductors are uncoupled and the electrical circuit therebetween is broken. In the event of an overcurrent condition, the first and second sets of by-pass conductors can withstand the current surge because of their increased dimensions. In the event of an overvoltage condition, arcing is largely inhibited by the spacing (i.e., separation) between the by-pass conductors on the plug and jack, and a non-conductive grease between the first set of contacts. Further, the plug may have a ridge that fits between, and thus, isolates the contacts on the jack.

In another embodiment, the improved interconnect apparatus has a cover pivotally hinged on the housing to permit access to a jack. The cover is provided with a dummy plug or actuator. The dummy plug does not have either a second set of by-pass conductors or a second set of contacts. Instead the housing of the interconnect apparatus contains both a first set of by-pass conductors and a second set of by-pass conductors. The first and second sets of by-pass conductors are mounted within the housing substantially parallel, but apart from one another. Further, one or both sets of conductors can be cantilevered to provide an elastic spring force when one set is moved in the direction of the other. The first set of by-pass conductors is electrically coupled to a first set of contacts exposed in the jack. The first set of by-pass conductors is further connected to the Telco wires, while the second set of by-pass conductors is connected to the subscriber wires. When the dummy plug is inserted into the jack, the tip of the plug forces one set of the by-pass conductors into contact with the other set of by-pass conductors. An electrical circuit is thereby completed between the Telco wires and the subscriber wires. However, when the cover is opened and the plug is removed, the sets of by-pass conductors move apart due to the elastic spring force and the electrical circuit is broken. Furthermore, the first set of conductors in the jack is exposed and a conventional test plug can be inserted. The jack, however, is dimensioned to prevent the tip of the test plug from creating contact between the first and second sets of by-pass conductors. Arcing is largely inhibited by providing a non-conductive grease between the first set of contacts.

The present invention relates broadly to telephone wiring interconnect apparatus and methods. As such, the invention relates to more than the improved interconnect apparatus and the specific wiring configuration disclosed and shown herein. In particular, a method of connecting Telco wires to subscribe wires through the improved interconnect apparatus is also disclosed.

BRIEF DESCRIPTION OF THE DRAWINGS

One or more preferred embodiments of the invention will be described more fully below and illustrated in the accompanying drawings in which.

DETAILED DESCRIPTION OF THE PREFERRED EMBODIMENTS

The present invention relates to a telephone wiring interconnect apparatus of the type commonly used in a network interface device (NID), such as a protected terminal device (PTD) or line module. The interconnect apparatus acts as a demarcation point between the wiring of a Telco provided telephone line and the wiring from a subscriber's telephone equipment. Since the interconnect apparatus serves as a point of demarcation, or separation, it is important that the interconnect apparatus also provide a means for a conventional test plug to determine whether the Telco wiring is providing a "dial tone" to the subscriber.

Figure 3A:
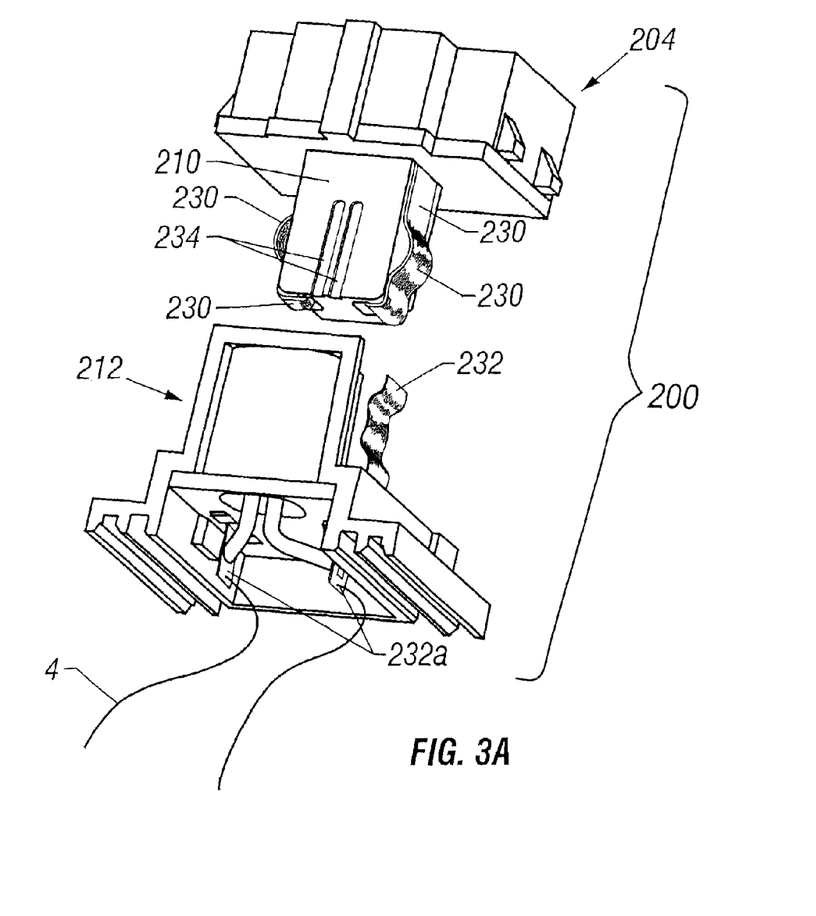
FIGS. 3A and 3B are perspective views of the jack and plug of a preferred embodiment of an interconnect apparatus according to the invention.
Figure 3B:
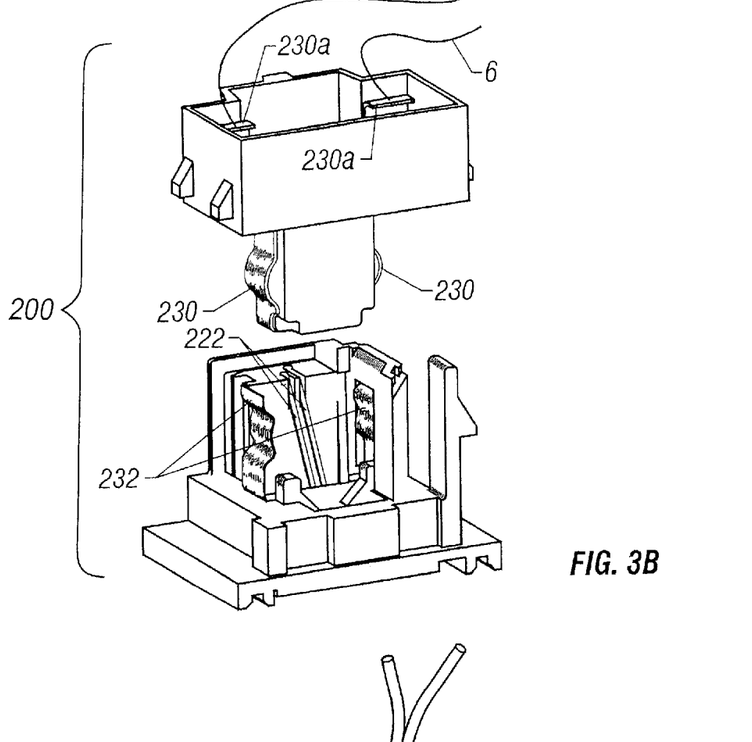

FIGS. 3A and 3B illustrate a first embodiment of an interconnect apparatus 200 according to the present invention. The interconnect apparatus 200 may, for example, be employed in a PTD or a line module that is mounted in a NID in a conventional manner. The interconnect apparatus 200 has a main housing (not shown), a cover 204, a plug 210 fixed to the cover 204, and a jack 212 disposed within the housing. The cover 204 preferably is movably attached to the housing, and most preferably, is hinged to the housing about a distal axis (not shown). For simplicity of illustration and clarity, only the plug 210, the jack 212, and a portion of the cover 204 are shown. The jack 212 has a first set of by-pass conductors 232. The conductors 232 may be formed from any conductive metal, such as phosphor bronze or beryllium copper. The metal chosen should have high electrical conductivity and elastic spring force for a purpose to be described. The conductors 232 should be spaced and sized to withstand both an overcurrent and an overvoltage condition. Specifically, the by-pass conductors should be able to pass a 2000 amp, 3000 volt test for a period of at least 250 milliseconds.

Each of the by-pass conductors 232 is provided with a detent to allow for positive elastic registration with a mating by-pass conductor 230 disposed on the plug 210. Each of the by-pass conductors 232 has an exposed by-pass contact 232a extending beneath the floor of the jack 212. The Telco wires 4 are electrically coupled to the by-pass prongs 232a. The jack 212 may have a generally rectangular shape with a front surface where a first set of contacts 222 (FIG. 3B) is located. As shown, the first set of by-pass conductors 232 are positioned on either of the first conductors 222 along the sides of the jack 212. Likewise, the second set of by-pass conductors 230 is positioned on the sides of the plug 210. As discussed hereinafter, the by-pass conductors 232, 230 can be located on other surfaces of the jack 212 and the plug 210, respectively.

The cover 204 has an integrally formed plug 210. The plug 210 has a second set of by-pass conductors 230 that are located so as to engage the first set of by-pass conductors 232 when the plug 210 engages the jack 212. The second set of by-pass conductors 230 may also be provided with complimentary detents to allow for positive elastic registration with the first set of conductors 232. Each of the second set of by-pass conductors 230 also has a pair of exposed by-pass contacts 230a that are electrically coupled to the subscriber's wiring 6 (FIG. 3B). As previously described, the second set of by-pass conductors 230 may also be electrically coupled to a set of terminals 118 on a bridge 108 to which the subscriber wires 6 are connected (see FIG. 2D).

The first set of contacts 222 of the jack 212 is best shown in FIG. 3B. However, the plug 210 does not require a corresponding pair of "second" contacts. This is because the signal being transmitted to and from the subscriber's equipment is carried by the by-pass conductors 232 and 230, and not the contacts 222. Regardless, the plug 210 may further have a thin ridge formed thereon between recesses 234 to provide some physical, dielectric or non-conductive barrier between the first contacts 222 on the jack. A non-conductive grease is also provided on the top and front surfaces of the jack 212 between the first contacts 222. Thus, if a voltage surge occurs as a result of an overvoltage event, arcing between the first contacts 222 is largely inhibited.

Figure 4A:
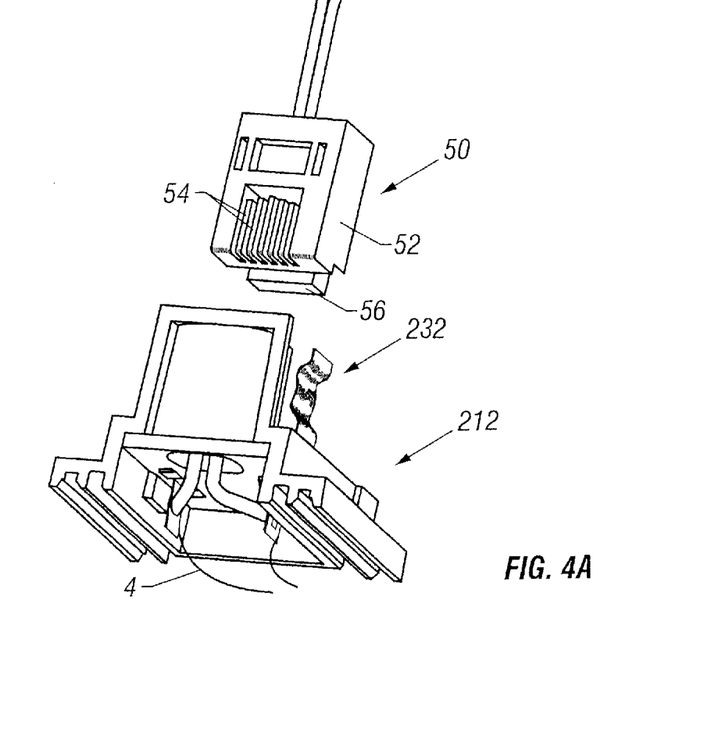
FIGS. 4A and 4B are perspective views of a standard RJ-11 style test plug engaging the first contacts in the jack of the interconnect apparatus of FIGS. 3A and 3B.
Figure 4B:
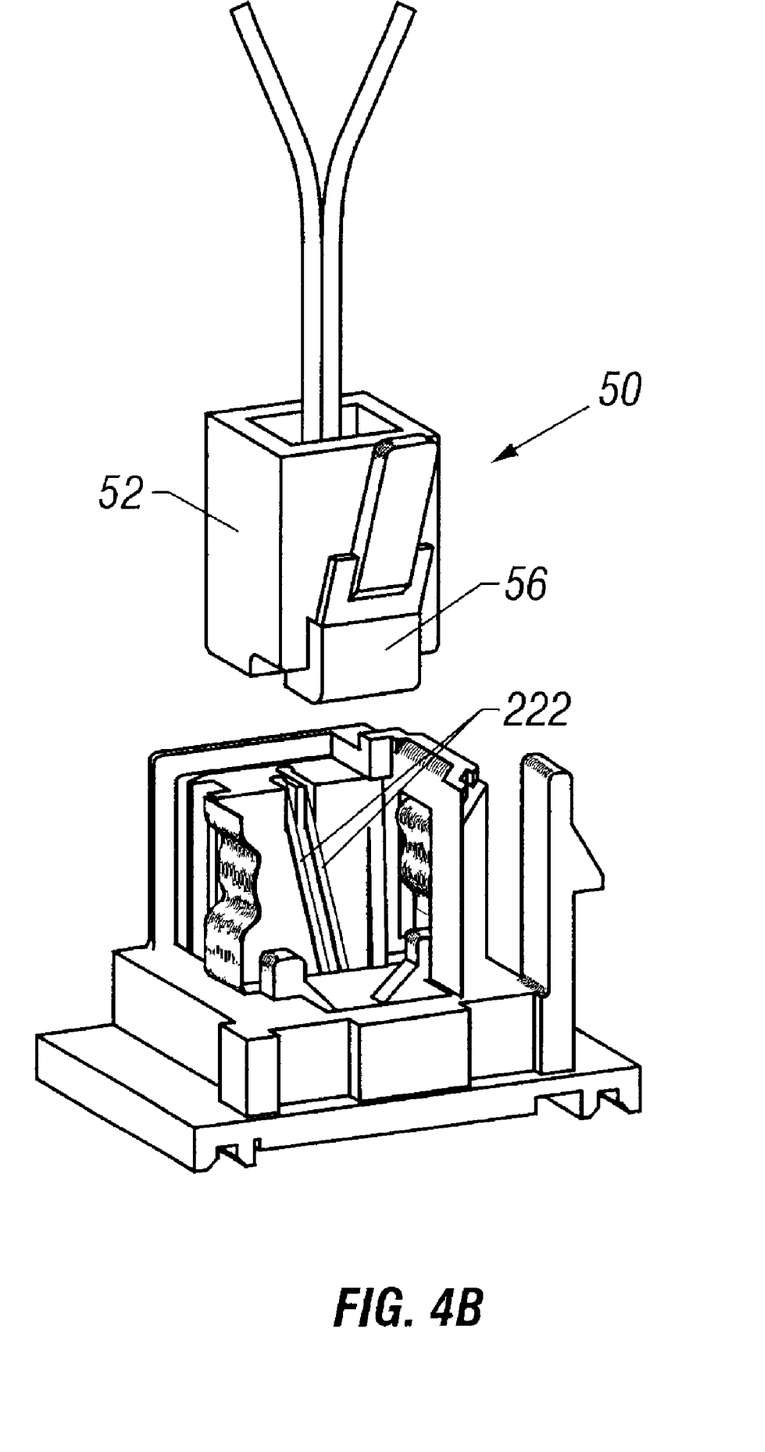

When the cover 204 is opened, the plug 210 disengages from the jack 212 so that a conventional test plug 50 can then be placed into the open jack 212, as shown in FIGS. 4A and 4B. As previously mentioned, it is common for an interconnect apparatus, such as PTD or line module, to be provided with an RJ-11 style jack. Further, it is common that test plugs be a standard RJ-11 style plug that engages the RJ-11 jack provided on the interconnect apparatus. Thus, the dielectric plug 52 of the test plug 50 has a second set of conductive contacts 54 that electrically couple with the first set of contacts 222 in the jack 212. The first set of by-pass conductors 232 on the jack 212 is positioned so as not to impede the insertion of the plug 52. The lateral surfaces of the dielectric plug 52 simply slide against the first set of conductors 232.

Figure 5A:
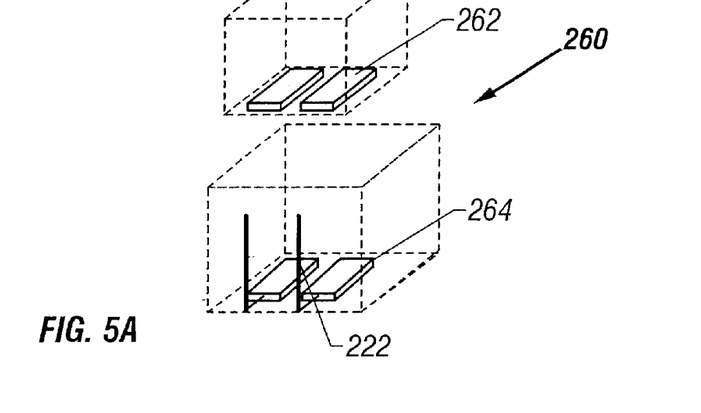
FIGS. 5A, 5B, and 5C illustrate various locations that the by-pass conductors may be positioned on the jack and plug of the interconnect apparatus of FIGS. 3A and 3B.
Figure 5B:
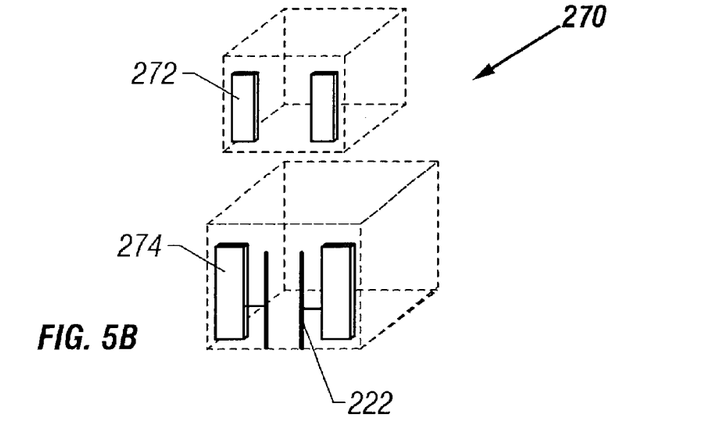
Figure 5C:
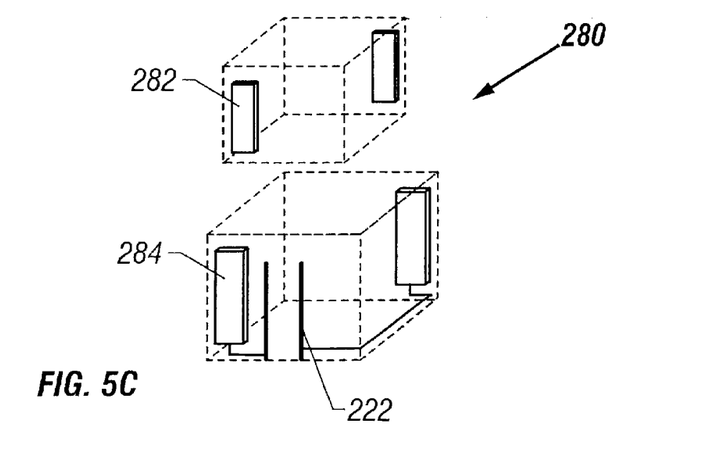

While the disclosure has illustrated described the by-pass conductors 230, 232 as being positioned along the sides of the plug 210 and jack 212, respectively, on either side of the first contacts 222. However, the conductors 230, 232 can be located on other mating surfaces as well. Various alternative placements of the by-pass conductors 230, 232 are illustrated in FIGS. 5A, 5B, and 5C. For example, pairs of first and second by-pass conductors 262, 264 of an interconnect apparatus 260 may be located on the end of the plug 210 and the floor of the jack 212, respectively, as shown in FIG. 5A. The first and second by-pass conductors 272, 274 of an interconnect apparatus 270 may be located on surfaces of the plug 210 and the jack 212, respectively, that are parallel to the first set of contacts 222, as shown in FIG. 5B. Furthermore, the first and second conductors 282, 284 of an interconnect apparatus 180 may be located on opposite surfaces of plug 210 and jack 212, respectively, as shown in FIG. 5C.

Figure 6A:
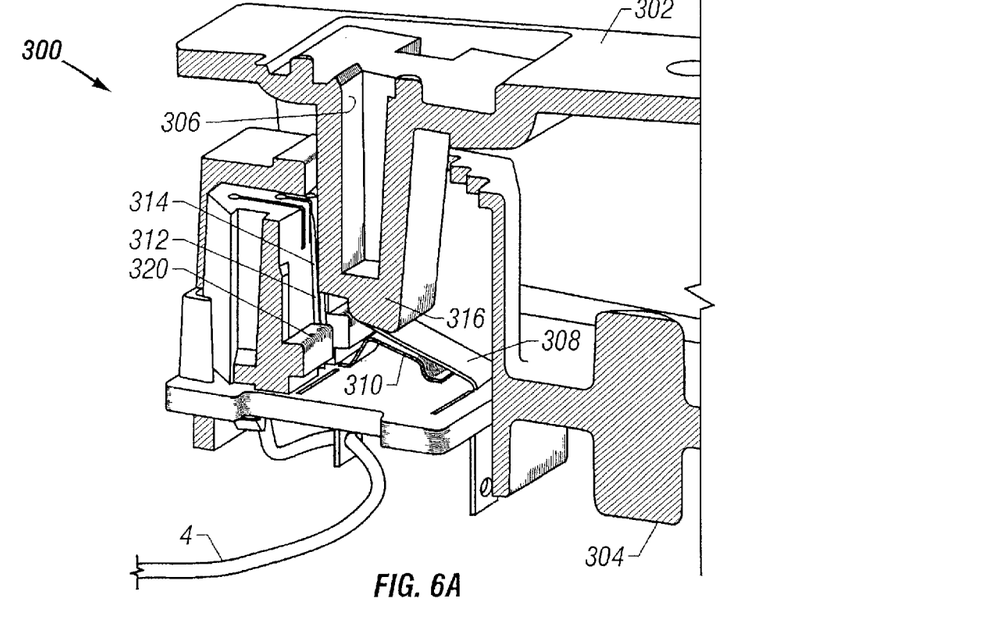
FIGS. 6A, 6B, and 6C are perspective views of another preferred embodiment of an interconnect apparatus according to the invention wherein the by-pass conductors are mounted within the housing of line module.
Figure 6B:
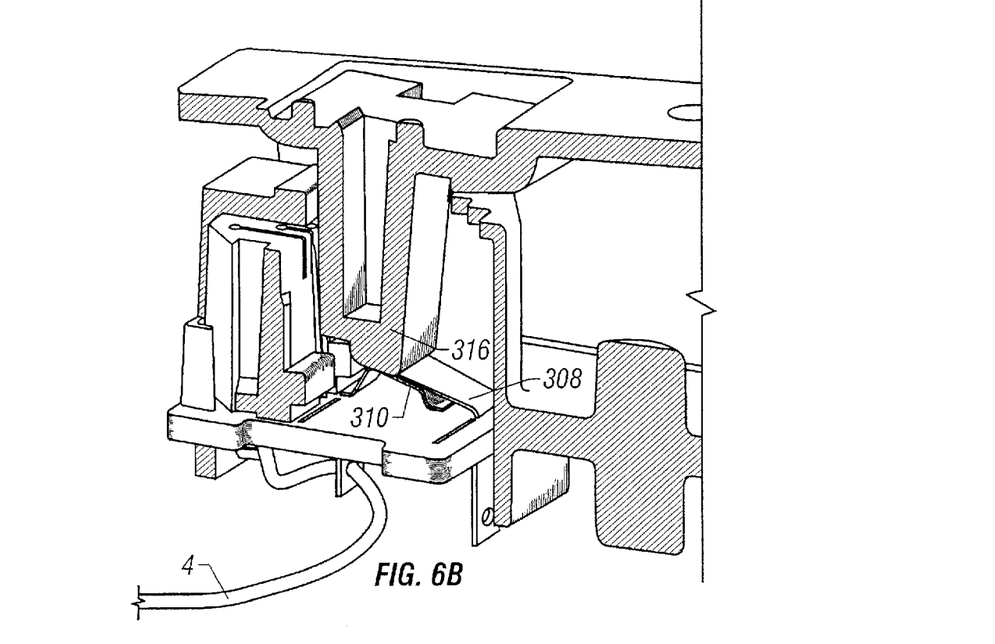
Figure 6C:
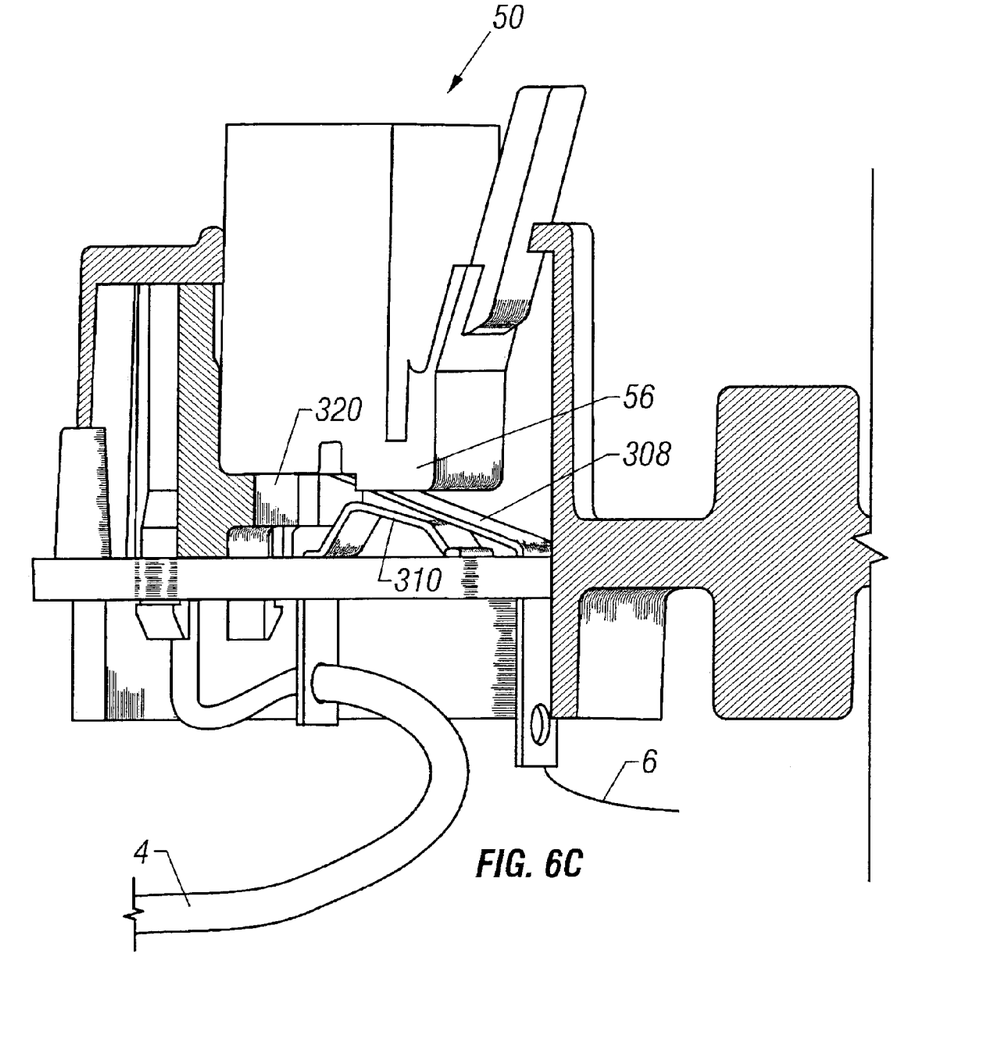

A second embodiment of an interconnect apparatus according to the invention includes first and second by-pass conductors positioned within the housing of a conventional line module. FIGS. 6A, 6B, and 6C illustrate a portion of a line module 300 having a housing 304 and a cover 302 hinged to the housing 304. The housing 304 may be integrally formed or may consist of two or more components, such as a lower barrier and a jack top, in a known manner. The cover 302 has a non-conductive dummy plug 306 that may also be referred to as an "actuator" or "plunger." Telco wires 4 are electrically coupled to both a first set of by-pass conductors 310 and a first set of contacts 312 positioned within a recess formed in the housing 304. A second set of by-pass conductors 308 is also positioned within the recess formed in the housing 304 such that the by-pass conductors 308 are closely separated from the by-pass conductors 310. As previously described, a non-conductive grease is provided within the recess of the housing 304 to largely inhibit arcing between the first set of contacts 312. For purposes of clarity and illustration, the line module 300 is shown sectioned between the first set of by-pass conductors 310, the first set of contacts 312, and the second set of by-pass conductors 308.

As the cover 302 is closed, the dummy plug 306 is received within the recess of the housing 304. The dummy plug 306 has a lower portion 314 that is characterized with an engaging portion 316. The engaging portion 316 contacts and forces the second by-pass conductors 308 downwardly until electrical contact is established with the first by-pass conductors 310. When the integrity of the Telco wiring must be determined, the cover 302 can be opened to expose the first set of contacts 312 within the recess formed in the housing 304. A conventional test plug 50 of the type as previously described, can then be inserted in the housing 304, as shown in FIG. 6C. However, a standard RJ-11 style test plug does not have an equivalent to the engaging portion 316 of the dummy plug 306. Furthermore, the travel of bottom surface 56 is limited by the inner surface 320 of the housing 304. Accordingly, the first and second by-pass conductors 310, 308 do not make contact with one another during the integrity test.

Figure 7A:
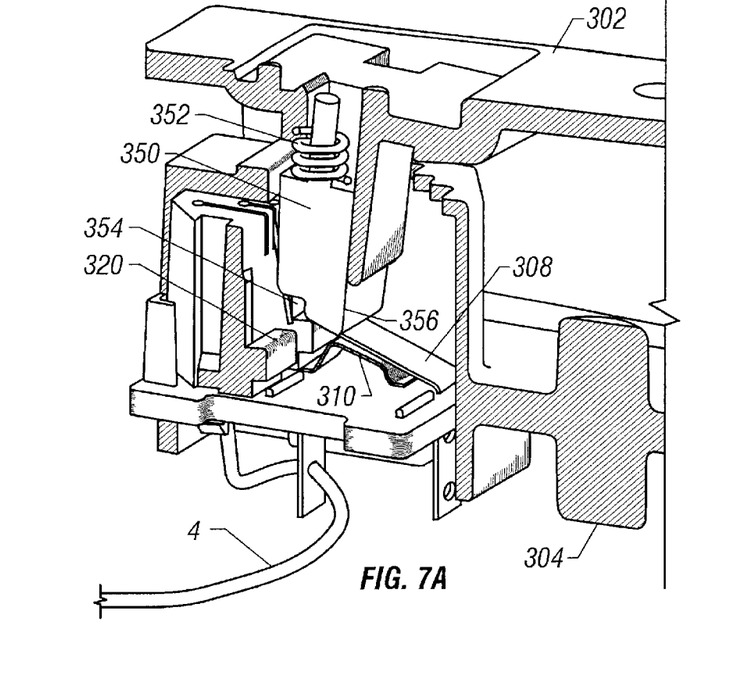
FIGS. 7A, 7B, and 7C illustrate an alternate plug for use with the interconnect apparatus of FIGS. 6A, 6B, and 6C.
Figure 7B:
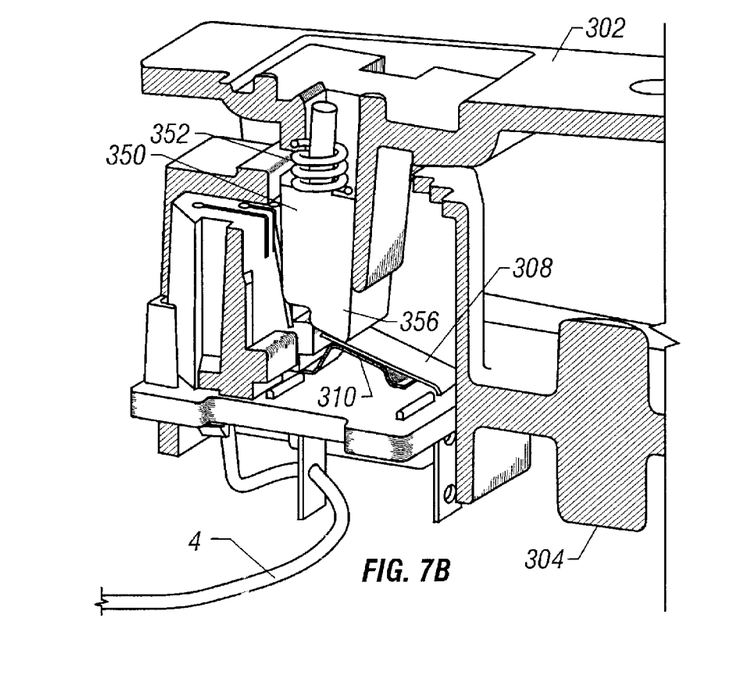
Figure 7C:
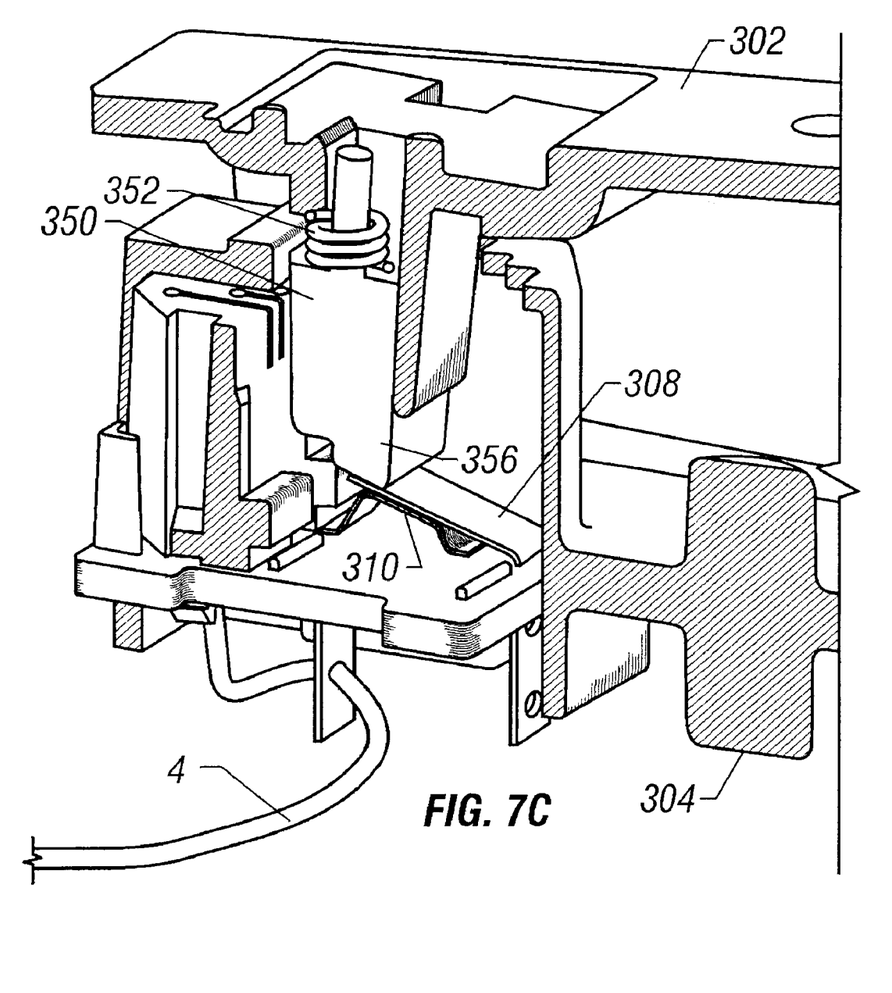

As shown in FIGS. 7A, 7B and 7C, an alternative dummy plug 350 made of a non-conductive material can be used to ensure that a sufficient amount of pressure is continuously exerted on the second by-pass conductors 308. During manufacture, the accumulation of allowable tolerances can result in the dummy plug 350 not extending into the recess formed in the housing 304 far enough when cover 302 is closed to cause the by-pass conductors 308, 310 to make sufficient electrical contact. Furthermore, over time, plastic material may "creep" and deform its shape. Therefore, a linear, elastic spring 352 can be used to augment the force applied to the by-pass conductors 308 by the dummy plug 350 when the cover 302 is closed. In particular, the dummy plug 350 is movable relative to the cover 302. The spring 352 is sized to exceed the elasticity of the conductors 308, 310. Specifically, the spring constant of spring 352 is slightly greater than the elastic constant of the cantilevered by-pass conductors 308. Thus, when the cover 302 is closed, the spring 352 will apply any additional force necessary to ensure that the conductors 308, 310 maintain sufficient electrical contact to couple the Telco wires 4 and the subscriber wires 6 regardless of manufacturing tolerances or creep effects.

FIG. 7A illustrates the relative positions of the first and second by-pass conductors 310, 308 when the cover 302 is in the open position and the engaging portion 356 of the lower portion 354 of the dummy plug 350 has not engaged the conductors 310, 308. The spring 352 is in an uncompressed state. In FIG. 7B, the cover 302 is shown partially closed and the engaging portion 356 of the dummy plug 350 has overcome the elastic constant of the cantilevered by-pass conductors 308 so that by-pass conductors 308 and 310 are in contact with one another. The spring 352, however, remains in the uncompressed state. Finally, in FIG. 7C, the cover 302 is shown fully closed and the spring 352 is compressed to produce a pre-load on the dummy plug 350. The pre-load force exerted by the spring 352 on the by-pass conductors 308 through the engaging portion 356 of the dummy plug 350 ensures that the by-pass conductors 308, 310 maintain sufficient electrical contact to couple the Telco wires 4 and the subscriber wires 6 despite the build-up of manufacturing tolerances or creep of the plastic material that may occur over time.

Figure 8A:
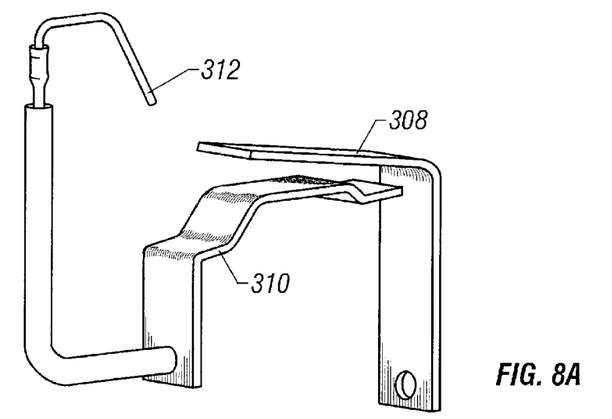
FIGS. 8A, 8B, and 8C are detailed perspective views of the wiring configuration of the interconnect apparatus of FIGS. 6A, 6B, and 6C illustrating the orientation of the by-pass conductors in the opened, closed, and test positions, respectively.
Figure 8B:
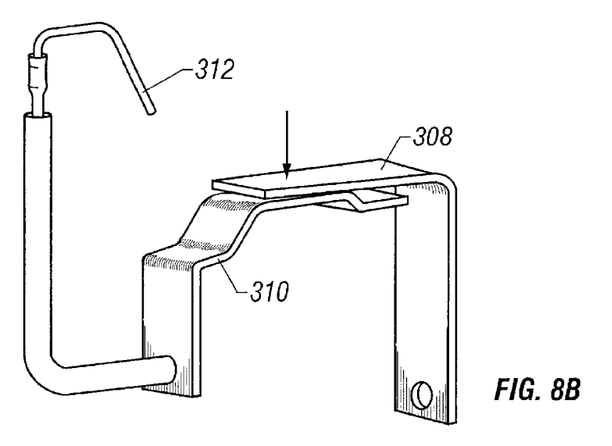
Figure 8C:
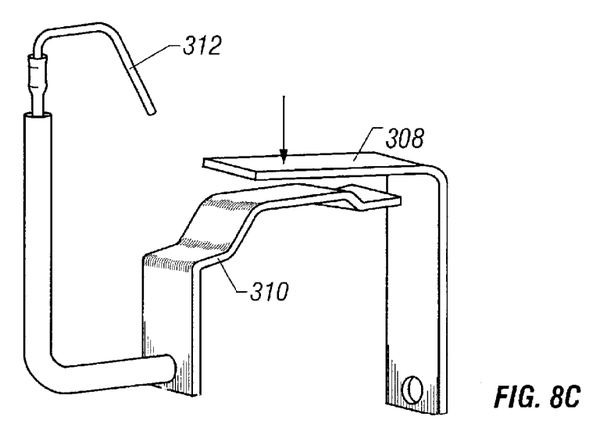

FIGS. 8A, 8B, and 8C are detailed perspective views of the wiring configuration of the interconnect apparatus 300 illustrating the orientation of the first and second by-pass conductors 310, 308 in the opened, closed, and test positions, respectively. Specifically, FIG. 8A illustrates the relative positions of the by-pass conductors 310, 308 when the cover 302 is opened and the dummy plug 306, 350 does not extend into the recess formed in the housing 304. FIG. 8B illustrates the relative positions of the by-pass conductors 310, 308 when the cover 302 is partially or fully closed and the dummy plug 306, 350 is received within the recess formed in the housing 304. In this configuration, second by-pass conductors 308 are forced into contact with first by-pass conductors 310 to establish an electrical connection between the Telco wires 4 and the subscriber wires 6. Finally, FIG. 8C illustrates the relative positions of the by-pass conductors 310, 308 when the cover 302 is opened and the test plug 50 is received within the recess formed in the housing 304. In this configuration, second by-pass conductors 308 are not forced into contact with the first by-pass conductors 310, and thus, the Telco wires 4 are not electrically coupled with the subscriber wires 6.

In operation, a Telco can utilize an interconnect apparatus according to the invention to electrically couple Telco wires to subscriber wires in a manner that will not fail in the event of an overcurrent or an overvoltage condition. Specifically, a preferred embodiment of a method according to invention includes the first step of providing Telco wiring, for example from a central office or distribution location, to a NID, for example mounted on the exterior wall of a house or commercial building. Preferably, the multiple twisted pairs of the Telco wiring is then separated into individual pairs of tip and ring wires. At least one pair of such tip and ring wires is next electrically connected to an interconnect apparatus, such as a PTD or line module, as previously described. Specifically, the tip and ring wires are connected to a first set of by-pass conductors that are electrically coupled to a first set of contacts wherein the first set of by-pass conductors are made or larger gauge wire than the first set of contacts. Subscriber wires are then electrically coupled to the interconnect apparatus or, for example, to a set of terminals provided on the housing of the interconnect apparatus. As previously described, the second set of by-pass conductors are then moved into contact with the first set of by-pass conductors. Thus, an electrical circuit is established between the Telco wires and the subscriber wires across the first and second by-pass conductors of the interconnect apparatus.

While the invention has been shown in only one of its forms, it should be apparent to those skilled in the art that it is not so limited, but is susceptible to various changes without departing from the scope of invention. Accordingly, it is intended that the appended claims encompass any alternative embodiments of the invention not disclosed herein that are within the ordinary skill of a person knowledgeable in the art of electrical wire connectors.

That which is claimed is:

1. A jack adapted to receive a removable plug comprising:
    a set of contacts disposed on the jack;
    a first set of conductors disposed on the jack and adapted to be electrically connected to Telco wires, the first set of conductors electrically connected to the Telco wires and to the set of contacts when the plug is not received within the jack; and
    a second set of conductors disposed on the plug and adapted to be electrically connected to subscriber wires, the second set of conductors electrically connected to the subscriber wires when the plug is not received within the jack, the second set of conductors electrically connected to the subscriber wires and to the first set of conductors when the plug is received within the jack to thereby establish an electrical connection between the Telco wires and the subscriber wires;
    wherein the first set of conductors and the second set of conductors each has a greater current carrying capacity than the set of contacts.

2. The jack of claim 1 wherein at least one of the first set of conductors and the second set of conductors has a detent for positive elastic registration with the other of the first set of conductors and the second set of conductors.

3. The jack of claim 1 wherein the jack has a floor, side surfaces depending from the floor, and a front surface depending from the floor between the side surfaces and wherein the set of contacts is disposed on the front surface.

4. The jack of claim 3 wherein the conductors of the first set of conductors depend from the floor and are positioned outwardly of the set of contacts.

5. An interconnect apparatus comprising:
    a jack;
    a removable plug adapted to be received within the jack;
    a set of contacts disposed on the jack;
    a first set of conductors disposed on the jack and adapted to be electrically connected to Telco wires, the first set of conductors electrically connected to the Telco wires and to the set of contacts when the plug is not received within the jack; and
    a second set of conductors disposed on the plug and adapted to be electrically connected to subscriber wires, the second set of conductors electrically connected to the subscriber wires when the plug is not received within the jack, the second set of conductors electrically connected to the subscriber wires and to the first set of conductors when the plug is received within the jack to thereby establish an electrical connection between the Telco wires and the subscriber wires;
    wherein the first set of conductors and the second set of conductors each has a greater current carrying capacity than the set of contacts.

6. The interconnect apparatus of claim 5 further comprising a removable bridge having a set of terminals electrically connected between the second set of conductors and the subscriber wires.

7. The interconnect apparatus of claim 5 wherein the plug comprises a ridge that is positioned between the set of contacts when the plug is received within the jack.

8. The interconnect apparatus of claim 5 wherein the jack is configured to receive a test plug to determine whether there is an electrical signal on the Telco wires when the plug is not received within the jack.

9. An interconnect apparatus comprising:
   a housing defining a recess;
   a cover movably attached to the housing;
   a non-conductive plug attached to the cover and adapted to be received within the recess;
   a set of contacts disposed within the recess;
   a first set of conductors disposed within the recess and adapted to be electrically connected to Telco wires, the first set of conductors electrically connected to the Telco wires and to the set of contacts when the plug is not received within the recess, the first set of conductors having a greater current carrying capacity than the set of contacts; and
   a second set of conductors disposed within the recess and adapted to be electrically connected to subscriber wires, the second set of conductors electrically connected to the subscriber wires when the plug is not received within the recess, the second set of conductors electrically connected to the subscriber wires and to the first set of conductors when the plug is received within the recess to thereby establish an electrical connection between the Telco wires and the subscriber wires, the second set of conductors having a greater current carrying capacity than the set of contacts.

10. The interconnect apparatus of claim 9 further comprising an elastic spring disposed between the cover and the plug such that the plug is movable relative to the cover.

11. The interconnect apparatus of claim 10 wherein the second set of conductors is cantilevered from the housing and wherein the spring constant of the spring is greater than the elastic constant of the second set of conductors.

12. The interconnect apparatus of claim 10 wherein the cover is movable between:
    a first opened position in which the spring is not compressed and the second set of conductors is not electrically connected to the first set of conductors; and
    a second partially closed position in which the spring is not compressed and the second set of conductors is electrically connected to the first set of conductors; and
    a third fully closed position in which the spring is compressed and the second set of conductors is electrically connected to the first set of conductors.

13. The interconnect apparatus of claim 9 wherein a non-conductive grease is provided between the set of contacts.

14. An electrical switch for establishing an electrical connection when a removable plug is received within a jack adapted to receive the plug, the switch comprising:
    a set of contacts;
    a first set of conductors adapted to be electrically connected to Telco wires, the first set of conductors electrically connected to the Telco wires and to the set of contacts when the plug is not received within the jack, the first set of conductors having a greater current carrying capacity than the set of contacts; and
    a second set of conductors adapted to be electrically connected to subscriber wires, the second set of conductors electrically connected to the subscriber wires when the plug is not received within the jack, the second set of conductors electrically connected to the subscriber wires and to the first set of conductors when the plug is received within the jack to thereby establish an electrical connection between the Telco wires and the subscriber wires, the second set of conductors having a greater current carrying capacity than the set of contacts;
    wherein one of the first set of conductors and the second set of conductors is movable relative to the other of the first set of conductors and the second set of conductors between an electrically unconnected position and an electrically connected position.

15. The switch of claim 14 wherein the set of contacts and the first set of conductors are disposed on the jack and the second set of conductors is disposed on the plug and wherein the plug is received within the jack in the electrically connected position.

16. The switch of claim 14 wherein the set of contacts, the first set of conductors, and the second set of conductors are each disposed on the jack and wherein the plug is received within the jack in the electrically connected position.

17. The switch of claim 14 wherein the set of contacts and the first set of conductors are disposed on the jack and wherein the jack is configured to receive a test plug in the electrically unconnected position.

18. A method of electrically connecting Telco wires with subscriber wires comprising:
    providing an interconnect apparatus comprising
        a jack adapted to receive a removable plug;
        a set of contacts disposed on the jack;
        a first set of conductors disposed on the jack and adapted to be electrically connected to the Telco wires, the first set of conductors electrically connected to the Telco wires and to the set of contacts when the plug is not received within the jack, the first set of conductors having a greater current carrying capacity than the set of contacts; and
        a second set of conductors adapted to be electrically connected to the subscriber wires, the second set of conductors electrically connected to the subscriber wires when the plug is not received within the jack, the second set of conductors electrically connected to the subscriber wires and to the first set of conductors when the plug is received within the jack to thereby establish an electrical connection between the Telco wires and the subscriber wires, the second set of conductors having a greater current carrying capacity than the set of contacts;
    electrically connecting the Telco wires to the first set of conductors;
    electrically connecting the subscriber wires to the second set of conductors; and
    receiving the plug within the jack so that the second set of conductors is electrically connected to the first set of conductors.

19. The method of claim 18 wherein
    the second set of conductors is disposed on the plug;
    the jack has a floor, side surfaces depending from the floor, and a front surface depending from the floor between the side surfaces;
    the set of contacts is disposed on the front surface;
    the first set of conductors depend from the floor and are positioned outwardly of the set of contacts; and
    the plug comprises a ridge that is positioned between the set of contacts when the plug is received within the jack.

20. The method of claim 18 wherein
    the interconnect apparatus further comprises a movable cover and a spring;

the plug is non-conductive and movably attached to the cover;

the spring is disposed between the plug and the cover;

the second set of conductors is cantilevered from the jack; and the spring constant of the spring is greater than the elastic constant of the second set of conductors;

the method further comprising:

moving the cover between an opened position wherein the second set of conductors is not electrically connected to the first set of conductors and the spring is not compressed to a partially closed positioned wherein the second set of conductors is electrically connected to the first set of conductors and the spring is not compressed; and subsequently moving the cover from the partially closed position to a fully closed position wherein the second set of conductors is electrically connected to the first set of conductors and the spring is compressed.

* * * * *